Patented Oct. 16, 1923.

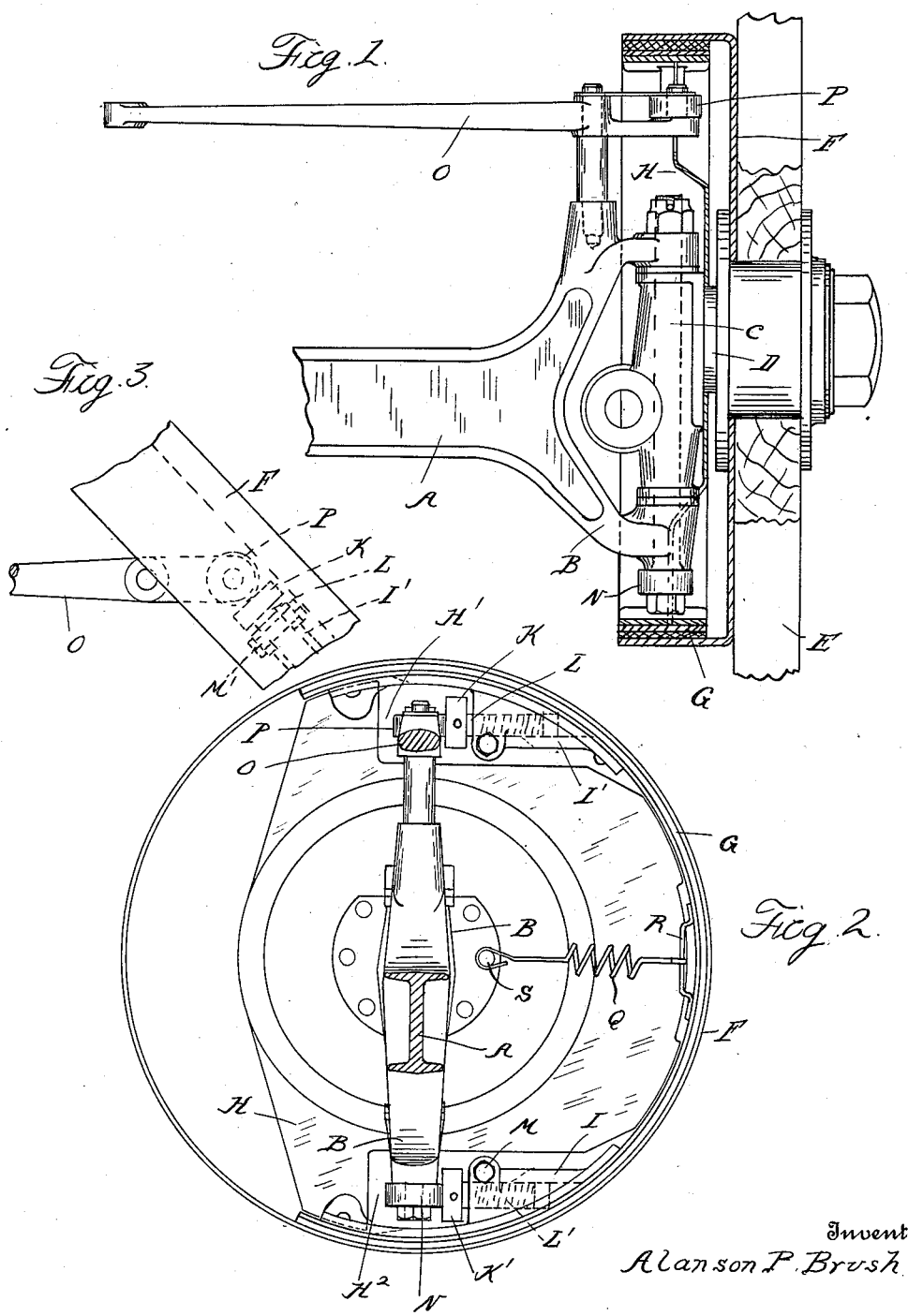

1,470,803

UNITED STATES PATENT OFFICE.

ALANSON P. BRUSH, OF DETROIT, MICHIGAN.

STEERING-WHEEL BRAKE.

REISSUED

Application filed December 5, 1921. Serial No. 519,907.

*To all whom it may concern:*

Be it known that I, ALANSON P. BRUSH, a citizen of the United States of America, residing at Detroit, in the county of Wayne and State of Michigan, have invented certain new and useful Improvements in Steering-Wheel Brakes, of which the following is a specification, reference being had therein to the accompanying drawings.

The invention relates to brakes for use upon vehicle wheels which have pivotal axles, as, for instance, the usual front wheel of a motor vehicle. It is the object of the invention to obtain a construction which will not interfere with the free turning or pivoting of the wheel and also one in which the braking reaction is taken care of independently of the axle pivot. To this end the invention consists in the construction as hereinafter set forth.

In the drawings:

Figure 1 is a front elevation of the axle and brake mechanism, the latter being partly in section;

Figure 2 is an elevation at right angles to Fig. 1;

Figure 3 is a plan view showing the brake drum in angular relation to the operating lever.

A is the stationary axle such as commonly used for the front axle of a motor vehicle and which is provided with the bifurcated end B forming bearings for the pivot C of the axle spindle D on which the wheel E is mounted. F is a brake drum mounted upon the wheel E which surrounds the furcations B and pivots C, and G is a brake shoe arranged within said brake drum.

In the construction of brakes for use upon rear axles, it is usual to transmit the brake reaction into the axles through the medium of an anchor rigidly attached to the axle. Where, however, the axle is pivotal, such a rigid anchor for the brake cannot be attached to the stationary portion of the axle without interference with the pivotal action. On the other hand, if the anchor for the brake is attached to the pivotal portion of the axle, this causes the transmission of the brake reaction through the axle pivot. Inasmuch as this pivot is considerably nearer the axis of the wheel than the brake, the force of the reaction is intensified and requires exceptionally strong pivot to safely take care of the same.

To avoid the difficulties just described I have devised a construction in which the brake reaction is carried into the stationary axle without interference with the free pivotal action and also one in which the brake operating mechanism is free from interference with the pivotal action. I have further devised an exceedingly simple construction of operating mechanism which is effective when used in connection with steering wheels, the specific construction being as follows:

H is a member, preferably formed of pressed sheet metal, which has a portion surrounding the axle spindle and which extends radially outward and then laterally inward into the central plane of the brake shoe, its peripheral portion forming a rest for said shoe. The member H is cut away at H' and H² to provide clearance for bracket members I and I' which are secured to the inner face of the shoe adjacent to opposite ends thereof. K and K' are abutments which are adjustably secured in the brackets I and I', preferably by being provided with threaded shanks L and L' engaging correspondingly threaded split sockets in said brackets, said sockets being clamped upon the threaded shanks by screws M. N is an abutment member which is secured to the stationary axle in alignment with the axis of the pivot C, being preferably a roller bearing secured to one of the furcations B. O is a lever which has a bearing P, preferably an antifriction roller, which, when the brake is set, is normally in substantial alignment with the axis of the pivot C on the diametrically opposite side of the shoe from the member N. The lever O is fulcrumed, preferably upon the furcation B, and the arrangement is such that when the lever O is moved in one direction, it will bear against the member K and transmit a thrust through the brake shoe to the member K' and to the abutment N. This will result in an expansion of the shoe and the forcing of the same into frictional contact with the inner face of the brake drum. The shoe G is normally retracted from contact with the drum by a spring Q, which is connected centrally therewith at R and is anchored upon the axle spindle as at S.

In operation, the brake is set by a movement of the lever O which forces the brake shoe against the inner face of the brake drum, while at the same time the wheel is free to turn upon the pivot C without interference from the brake mechanism. This is for the reason that both the abutment N and the bearing P are in substantial alignment with the axis of the pivot, so that there will be no relative displacement by the turning of the wheel around said pivot. On the other hand, all of the braking stress is transmitted directly into the stationary axle without any strain upon the pivot of the spindle.

What I claim as my invention is:

1. The combination with an axle and a spindle pivotally attached thereto, of a wheel mounted on said spindle, a brake drum on said wheel surrounding the pivotal connection of the spindle, a brake shoe for engaging said brake drum supported by said spindle, and means for transmitting the braking reaction to the stationary portion of said axle independent of the pivotal connection of the spindle.

2. The combination with an axle having a spindle pivotally connected thereto, of a wheel mounted on said spindle, a brake drum on said wheel surrounding the pivotal connection of the spindle, a brake shoe for engaging said brake drum supported by said spindle, and means for transmitting the braking reaction to the stationary portion of the axle independent of the pivotal connection of the spindle, said means including a pivot in substantial alignment with the pivot of the spindle.

3. The combination with an axle having a spindle pivotally attached thereto, of a wheel mounted on said spindle, a brake drum on said wheel surrounding the pivotal connection of the spindle, a brake shoe for engaging said brake drum, a member mounted on said spindle forming a support for said brake shoe, an anchor for said shoe connected to the stationary portion of the axle, a pivotal connection between said anchor and shoe independent of and in substantial alignment with the pivot for the spindle, and means for applying the brake also in substantial alignment with the pivot of the spindle.

4. The combination with an axle, of a spindle pivotally attached thereto, a wheel mounted on said spindle, a brake drum on said wheel surrounding the pivotal connection of said spindle, a brake shoe within said drum, a member mounted on said spindle forming a support for said brake shoe, an anchor for said brake shoe secured to the stationary portion of the axle and pivotally connected to said shoe in alignment with the pivot of said spindle, and a lever for operating said shoe having pivotal engagement therewith on the diametrically opposite side of the drum.

5. The combination with an axle and a spindle pivotally connected thereto, of a wheel mounted on said spindle, a drum on said wheel surrounding the pivotal connection of said spindle, a brake shoe within said drum, a member mounted on said spindle forming a support for said brake shoe, an anchor for said brake shoe connected to the stationary portion of the axle and pivotally connected to the shoe in alignment with the pivot of said spindle, a lever fulcrumed upon the stationary portion of said axle, and a pivotal connection between said lever and said shoe on the diametrically opposite side of the drum, said pivot being in substantial axial alignment with the pivot of the spindle.

6. The combination with an axle having a bifurcated end portion, of a spindle pivotally connected between the furcations of said axle, a wheel mounted on said spindle, a brake drum on said wheel surrounding the pivotal connection of the spindle, a brake shoe within said drum, a member mounted on said spindle forming a support for said brake shoe, an anchor for said brake shoe pivotally engaging one of said furcations in axial alignment with the pivot for the spindle, a lever fulcrumed on the opposite furcation, and a pivotal engagement between said lever and said brake shoe.

7. The combination with an axle having a bifurcated end portion, of a spindle pivotally secured between the furcations of said axle, a wheel mounted on said spindle, a brake drum secured to said wheel and surrounding the pivotal connection of the spindle, a brake shoe within said drum, a member mounted on said spindle forming a support for said brake shoe, an anchor for one end of said shoe pivotally secured to one of said furcations in alignment with the pivot of the spindle, a lever fulcrumed on said axle on the diametrically opposite side from said anchor, and a roller bearing on said lever in substantial alignment with said pivotal bearing for the spindle, said roller engaging said brake shoe to apply the braking pressure thereto.

8. The combination with an axle having a bifurcated end portion, of a spindle connected between the furcations of said axle, a wheel mounted on said spindle, a brake drum on said wheel surrounding the pivotal connection of said spindle, a brake shoe within said drum, a member mounted on said spindle forming a support for said brake shoe, a thrust bearing for one end of said brake shoe on said stationary axle and concentric with the axis of said pivot, and a lever having a portion substantially concentric with the axis of said pivot for engaging the opposite end of said brake shoe to force the same into frictional contact with said brake drum.

9. The combination with an axle having a bifurcated end portion, of a spindle connected between the furcations of said axle, a wheel mounted on said spindle, a brake drum on said wheel surrounding the pivotal connection of the spindle, a brake shoe within said drum, a pressed sheet metal member mounted on said spindle extending within said brake shoe and forming a support therefor when out of frictional engagement with said drum, an abutment bearing on one end of said brake shoe, a bearing on said stationary axle and concentric with the pivot of the spindle, said bearing engaging said abutment bearing of said shoe, a lever fulcrumed upon said stationary axle having a portion substantially concentric with the axis of said pivot on the diametrically opposite side of the shoe, and an abutment bearing on said shoe for engaging said lever bearing.

10. The combination with an axle and a spindle pivotally attached thereto, of a wheel mounted on said spindle, a brake drum on said wheel, a brake shoe for engaging said drum, a pressed sheet metal member mounted on said spindle extending within said brake shoe and forming a support therefor when out of frictional engagement with said drum, an actuating member for said brake shoe having at all times a fixed relation to the stationary axle, and coacting means whereby said actuating member is operable to engage said brake shoe in all positions of adjustment of the spindle and wheel, said actuating member and said coacting means being arranged to transmit the braking reaction to the stationary portion of said axle independent of the pivotal connection of the spindle.

In testimony whereof I affix my signature.

ALANSON P. BRUSH.